F. J. IMBACH.
HOSE APPLIANCE.
APPLICATION FILED JULY 25, 1916.
1,331,923. Patented Feb. 24, 1920.
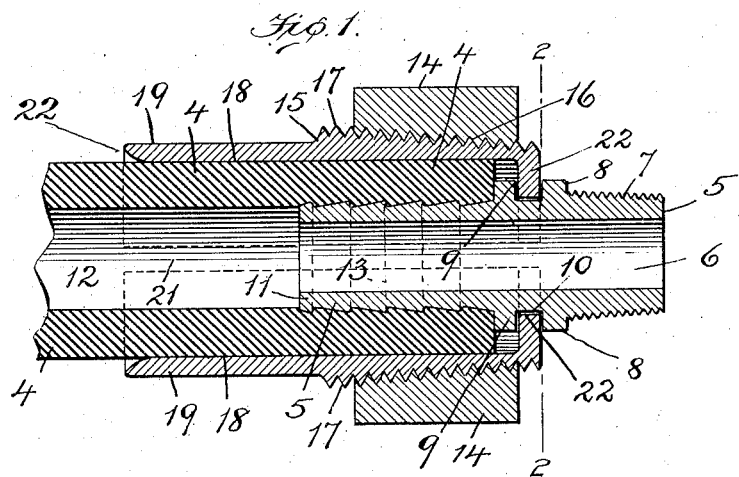
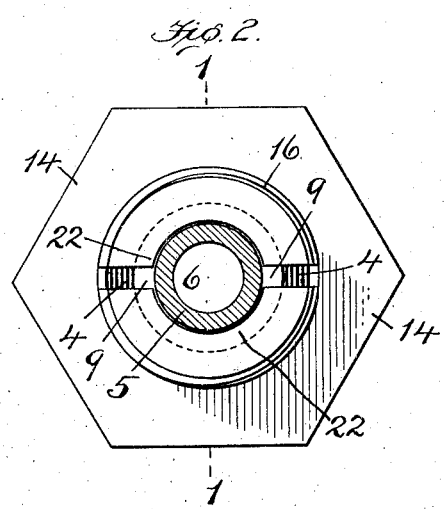
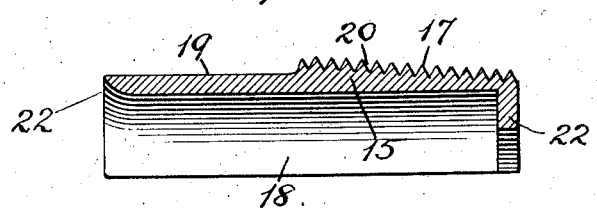
Witness
Edwin L. Bradford
Izella E. Bagley.
Inventor
Frank J. Imbach
By
Mann & Co,
Attorneys,

UNITED STATES PATENT OFFICE.

FRANK J. IMBACH, OF BALTIMORE, MARYLAND.

HOSE APPLIANCE.

1,331,923.     Specification of Letters Patent.     Patented Feb. 24, 1920.

Application filed July 25, 1916. Serial No. 111,118.

*To all whom it may concern:*

Be it known that I, FRANK J. IMBACH, a citizen of the United States, residing at Baltimore, in the State of Maryland, have invented certain new and useful Improvements in Hose Appliances, of which the following is a specification.

This invention relates to a hose appliance to be used on hose employed for high pressure fluids such as steam or air, for connecting an end piece of hose with a tool, such as a pneumatic hammer or any other device or machine operated by fluid pressure.

The invention consists of improved constructions of the several parts whereby their operative coaction is bettered and also certain objections heretofore existing are removed.

The improved structure is illustrated in the accompanying drawing in which Figure 1 is a longitudinal vertical section of the device taken on the line 1—1 of Fig. 2. Fig. 2 is partly an end elevation and a vertical cross-section on the line 2—2 of Fig. 1. Fig. 3 is a longitudinal section of one-half part of the clamping sleeve also seen in section in Fig. 1.

Referring now by the use of designating numerals, to the said drawing, the numeral, 4, designates an end of a piece of hose shown in section and which is to be attached to any desired tool or engine that is so constructed as to be driven by the power of fluid under pressure—such fluid as steam or compressed air. The parts that are herein shown combined with the said hose-end, 4, are the same in number as have heretofore been shown in some other devices of analogous character, but certain improvements are herein disclosed in the particular construction of said parts whereby new and better results are obtained.

A nipple, 5, has a smooth tubular bore, 6, extending through it from end to end; its outer or nipple end is provided with an exterior screw-thread, 7, which serves as means for attachment to a pneumatic tool or other device; an exterior circumferential shoulder, 8, surrounds the nipple at the base of the said screw-thread. A second shoulder, 9, is on the exterior of the nipple tube and is spaced from the said shoulder, 8, and this space forms a groove, 10, around the nipple. The inner end, 11, of the tubular nipple from the second shoulder, 9, fits or telescopes tightly within the bore, 12, of the hose, 4, as shown in Fig. 1. The exterior surface of the inner end of the tubular nipple, 5, has surrounding ring-shaped corrugations, 13, which embed in the inner surface of the bore, 12, of the hose, 4, and serve to prevent the nipple tube withdrawing therefrom.

It is to be understood that that part of the rubber hose, 4, which surrounds the tubular metal nipple, will be subjected to compression when the solid nut, 14, is turned on the split and tapered clamping sleeve, 15. A difficulty has existed in accurately engaging the continuous internal threads, 16, of the solid nut, with the disconnected external threads, 17, on the two segment or separate parts of said clamping sleeve.

In manufacturing the split metal clamping sleeve, 15, the device is first shaped with an internal straight tube or bore, 18, into which the rubber hose-end, 4, is subsequently inserted. Commencing at the inner end of the metal sleeve about one-half of the exterior part of this metal sleeve, considered longitudinally, is straight as at, 19, and the other half of said exterior has its greatest diameter at the center and adjoining said straight part, and therefrom tapers, as at, 20, toward the outer end of the sleeve. The exterior screw threads, 17, are cut only on the tapered parts, 20. At this stage of manufacture the sleeve has the form of a tube. After the exterior screw-threads, 17, have been formed, the entire tube or sleeve structure is cut longitudinally from end to end and two narrow strips of metal are entirely removed, one strip being diametrically opposite the other; a narrow slot, 21, see Fig. 1, in broken lines, indicates the longitudinal space produced by the removal of one of said narrow metal strips. In this way one segment part or one half-part of said clamping sleeve, has external screw-threads, 17, and the other half-part also has external screw-threads, 17, but of course there is a disconnection of the threads of said two-half parts along the edges of said narrow slot, 21, and this disconnection of threads causes the difficulty referred to when it is sought to apply the solid nut, 14, on said threads.

The difficulty now alluded to has been due to the fact that heretofore where the exteriorly screw-threaded clamping sleeve has consisted of a plural number of separate parts, it was possible for one of said plural parts to slide longitudinally without another part also sliding, and this slight sliding movement disconnected the spiral line of the exterior screw-threads on the clamping sleeve, the result of which was that the internal continuous screw-threads on the solid nut would not accurately engage the said disconnected threads.

The present improved device obviates the difficulty just mentioned by combining in each one of the several segment parts that comprise the clamping sleeve, the following features, namely, each segment part to have an exterior screw-thread, 17, and at its outer end to also have an inturned right-angle segment-shaped flange, 22, which fits into the said circumferential groove, 10, on the nipple, 5. A clamping sleeve having exterior screw-threads, 17, and made up of a plural number of segment parts thus constructed would allow the internal screw-threads 16 on a solid nut, 14, to accurately engage and turn on the said exterior threads, 17, without any difficulty whatever.

The extreme end of the split clamping sleeve has its interior edge beveled or rounded off, as at, 23, to prevent injury to the hose when the latter is bent at such edge. In addition to this preventive of injury to the hose when bent, I have constructed the two metal parts, namely, the clamping sleeve for the exterior, and the tubular nipple for the interior of the hose so that the end, 23, of the exterior clamping sleeve only will bear in contact with the hose by reason of the end, 11, of the tubular nipple terminating in the bore, 12, of the hose well back of the point where the rounded end of the clamping sleeve terminates, as in Fig. 1.

Having described my invention I claim,—

The combination with a nipple having a threaded outer end and two spaced-apart annular stop-shoulders thereon between the outer and inner ends thereof, of a hose having its ends at the side of the inner one of said two stop-shoulders and around the inner end of the nipple; two clamping members each having a semi-circular flange at one end and each member increasing in external diameter from the said flange-end for a portion of its length only and said ends of the members being provided with screw-threads which increase in diameter as they recede from the said flange-end,—the inner end of the clamping members being provided with a flared edge which flares outwardly away from the circumference of the hose, and a solid nut having an angular exterior and a tapered and threaded interior, said nut having a uniform exterior dimension at both ends on any angle measured from its axis outwardly and the smaller threaded interior end of the nut having position nearer to the flange-end of the clamping-members than the larger threaded interior end thereof whereby the parts may be placed in position with respect to the hose and the nut then passed over the threaded end of the nipple and screwed onto the tapered threads.

In testimony whereof I affix my signature in the presence of two witnesses.

FRANK J. IMBACH.

Witnesses:
CHARLES B. MANN, Jr.,
IZELLA E. BAGLEY.